United States Patent [19]

Enter, Sr.

[11] 4,333,490
[45] Jun. 8, 1982

[54] APPARATUS AND METHOD FOR CONTROLLING A WATERING SYSTEM

[76] Inventor: William L. Enter, Sr., 525 S. Aqua Clear Dr., Mustang, Okla. 73064

[21] Appl. No.: 109,542

[22] Filed: Jan. 4, 1980

[51] Int. Cl.³ ............................................. A01G 25/16
[52] U.S. Cl. ..................................... 137/78.3; 137/80; 137/624.11; 239/64; 239/70; 307/118; 361/175; 361/178
[58] Field of Search ................... 137/78.1, 78.2, 78.3, 137/78.5, 79, 80, 624.11; 239/64, 69, 70, 71; 361/165, 175, 178; 307/118

[56] References Cited

U.S. PATENT DOCUMENTS

| | | | |
|---|---|---|---|
| 3,590,335 | 6/1971 | Tetar | 239/64 |
| 3,951,339 | 4/1976 | Du Fresne | 239/70 |
| 3,991,375 | 11/1976 | Riggs et al. | 239/64 |
| 3,991,939 | 11/1976 | Maclay | 239/70 |
| 4,014,359 | 3/1977 | Sanner | 137/78.2 |
| 4,023,585 | 5/1977 | VandenBurg | 239/70 |
| 4,114,647 | 9/1978 | Sturman et al. | 137/624.2 |
| 4,176,395 | 11/1979 | Evelyn-Veere et al. | 239/69 X |
| 4,190,884 | 2/1980 | Medina | 239/63 |
| 4,197,886 | 4/1980 | Neal | 137/78.3 X |
| 4,232,707 | 11/1980 | Sturman et al. | 239/70 |
| 4,256,133 | 3/1981 | Coward et al. | 137/78.3 |

Primary Examiner—A. Michael Chambers

Attorney, Agent, or Firm—Robert M. Hessin; E. Harrison Gilbert, III

[57] ABSTRACT

An apparatus for automatically controlling a watering system in response to a comparison of an ambient condition with a time-varying reference level having an adjustable maximum value is disclosed. The invention includes an electrical circuit for monitoring and sensing the magnitude of the ambient condition and for converting the sensed magnitude into a proportional electrical signal. The invention further includes a first timer circuit for generating a triggering signal when the time-varying reference level exceeds the magnitude of the proportional electrical signal. This triggering signal is applied to a second timer circuit which actuates the watering system for a predetermined period of time in response to the triggering signal. Furthermore, the present invention includes a disabling circuit which compares the proportional electrical signal with a predetermined cut-off level and prevents the first timer circuit from generating the triggering signal whenever the magnitude of the proportional electrical signal passes the cut-off level. The present invention further includes a plurality of controls by which the time periods of the first timer and second timer circuits may be adjusted. Also, there are controls whereby predetermined reference levels can be established so that the apparatus is in a lock-out condition whenever the reference levels are passed.

43 Claims, 5 Drawing Figures

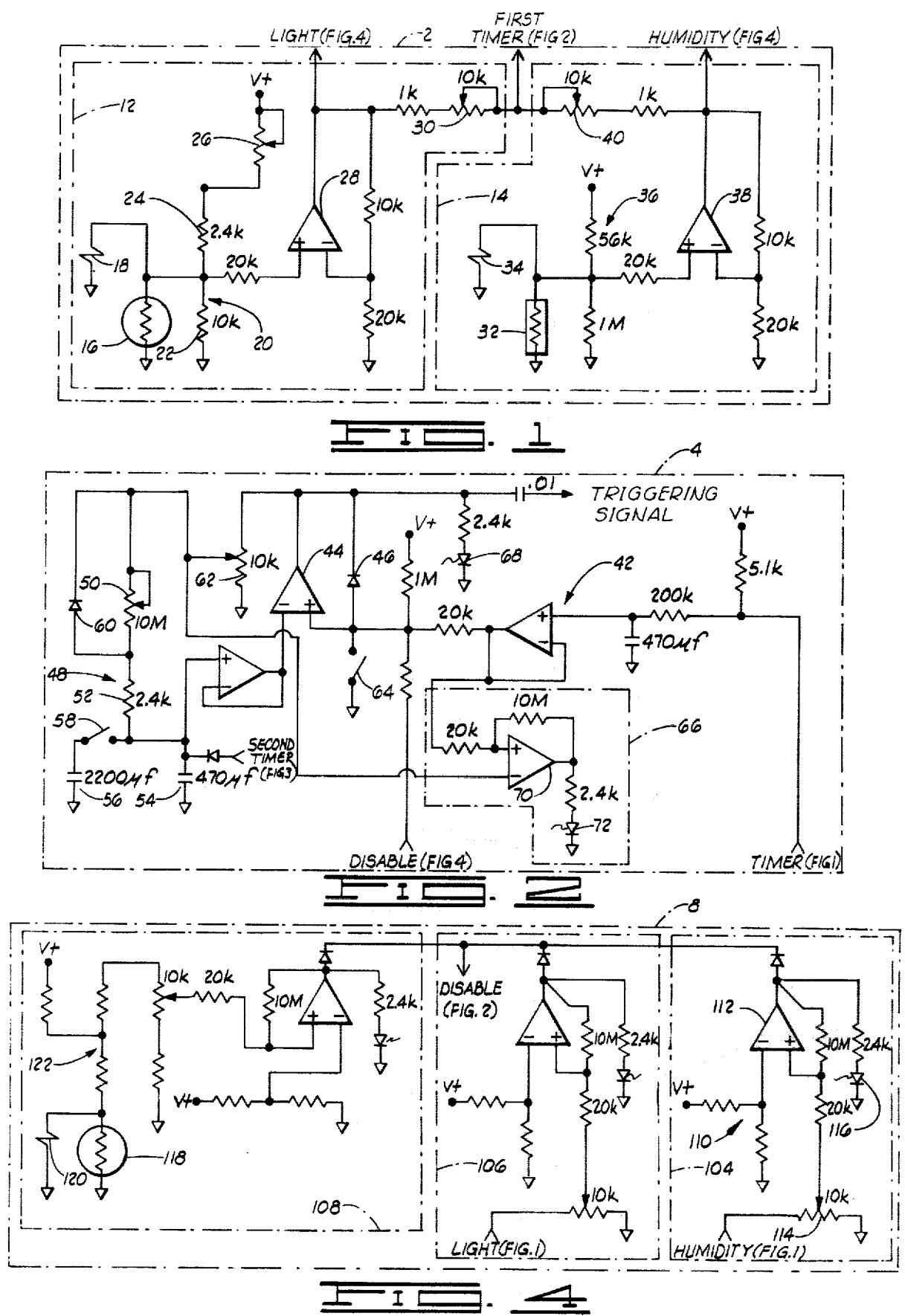

APPARATUS AND METHOD FOR CONTROLLING A WATERING SYSTEM

BACKGROUND OF THE INVENTION

1. Field of the Invention

This invention relates generally to watering system control devices and more particularly, but not by way of limitation, to apparatus for automatically controlling a watering system in response to the monitoring of various ambient conditions, such as light intensity, humidity and temperature.

2. Description of the Prior Art

In the cultivation of plants it is important to correlate the watering of the plants with the amount of ambient sunlight. It is also important to correlate the watering with the ambient levels of humidity and temperature. Because plants are cultivated both indoors and outdoors, it is also important to properly control the watering in response to the conditions which may occur in either location. By properly watering the plants in correspondence with the respective levels of these ambient conditions, it is possible to overcome heat and water stresses which occur in the plants.

In view of the importance of the relationship between plant watering and ambient conditions, there is a need for an apparatus for automatically controlling a plant watering system in response to the various ambient conditions. Although it has been previously known that plant growth is correlated with light intensity, it is not believed that the need for a system responsive to a plurality of ambient conditions and having a variety of operating modes has been proposed. Therefore, I believe that the prior art has the shortcoming of failing to meet the need of such a responsive system.

SUMMARY OF THE INVENTION

The present invention overcomes the above-noted and other shortcomings of the prior art by providing a novel, useful and improved apparatus for controlling a watering system. This apparatus automatically controls a plant watering system in response to the sensing of ambient conditions, such as light intensity, humidity and temperature. Furthermore, the present invention provides a variety of operating modes so that a plurality of combinations of ambient conditions may be used to control the watering system.

In general, the present invention provides an apparatus for automatically controlling a watering system in response to a comparison of an ambient condition with a time-varying reference level having an adjustable maximum value. The apparatus includes monitor means for sensing the magnitude of the ambient condition and converting the sensed magnitude into a proportional electrical signal. A first timer means is provided for generating a triggering signal when the time-varying reference level exceeds the magnitude of the proportional electrical signal. There is also a second timer means, responsive to the triggering signal, for actuating the watering system for a predetermined period of time. The control apparatus further includes disabling means for comparing the proportional electrical signal with a predetermined cut-off level and for preventing the first timer means from generating the trigger signal when the magnitude of the proportional electrical signal passes the cut-off level.

The monitor means includes a sensor having a resistance which varies relatively to the magnitude of the ambient condition sensed by the sensor, and also includes means for establishing the proportional relationship between the sensed ambient condition and the proportional electrical signal generated by the monitor means. The monitor means additionally includes modulation means for modulating the operation of the first timer means so that a plurality of operating modes is provided.

The first timer means includes means for adjustably setting the maximum value of the time-varying reference level, and further includes means for comparing the time-varying reference level with the magnitude of the proportional electrical signal to determine when the reference level exceeds the magnitude of the electrical signal.

The second timer means includes means for changeably setting the predetermined period of time that the second timer means actuates the watering system in response to the triggering signal. The second timer means also includes switch means connected to a valve in the watering system and means, responsive to the changeable setting means and the triggering signal, for controlling the operation of the switch means.

The disabling means includes means for variably setting the cut-off level, means for detecting when the cut-off level has been passed by the magnitude of the proportional electrical signal, and means for coupling the detecting means to the first timer means.

Therefore, from the foregoing, it is a general object of the present invention to provide a novel, useful and improved apparatus for controlling a watering system. Other and further objects, features and advantages of the present invention will be readily apparent to those skilled in the art upon a reading of the description of the preferred embodiment which follows when taken in conjunction with the accompanying drawings.

BRIEF DESCRIPTION OF THE DRAWINGS

FIG. 1 is a schematic diagram of a preferred embodiment circuit of the monitor means of the present invention.

FIG. 2 is a schematic diagram of a preferred embodiment circuit of the first timer means of the present invention.

FIG. 4 is a schematic diagram of a preferred embodiment circuit of the disabling means of the present invention.

DETAILED DESCRIPTION OF THE PREFERRED EMBODIMENT OF THE INVENTION

Figure 3:
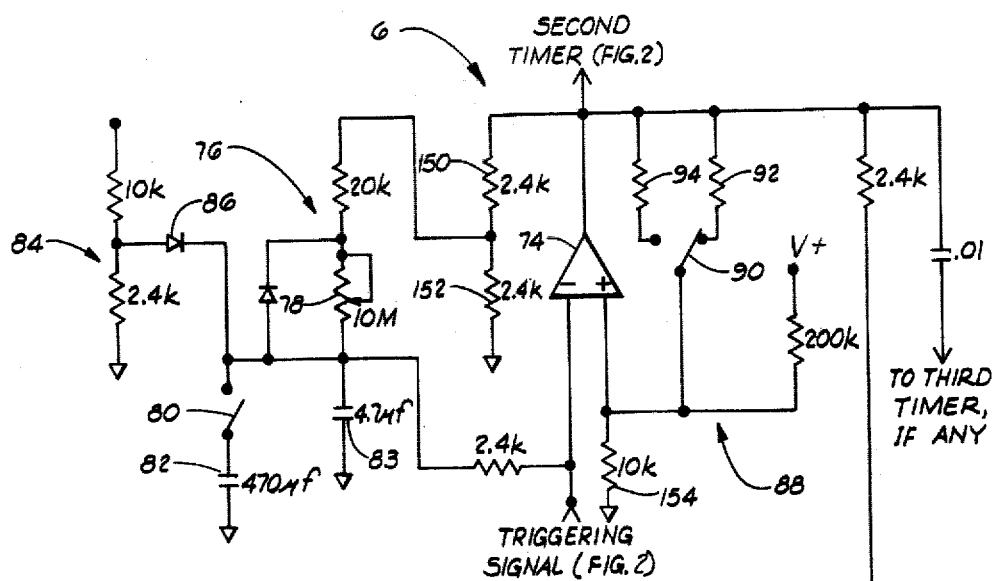
FIG. 3 is a schematic diagram of a preferred embodiment circuit of the second timer means of the present invention.

With reference to the drawings, there is schematically shown a preferred embodiment circuit embodying the present invention. These schematic drawings disclose that the preferred embodiment includes a monitor means 2, a first timer means 4, a second timer means 6, a disabling means 8, and a power supply circuit means 10.

Referring to FIG. 1, the preferred embodiment circuit of the monitor means 2 will be described. Generally, the monitor means 2 senses the magnitude of an ambient condition and converts the sensed magnitude into a proportional electrical signal (i.e., a signal which is proportional to the magnitude of the sense condition). In the preferred embodiment the monitor means 2 senses the ambient conditions of light and humidity by utilizing a means 12 for monitoring light and converting the intensity of the light into a first voltage proportional to the monitored light and by further utilizing a means 14 for monitoring humidity and for converting the level of humidity into a second voltage proportional to the monitored humidity.

The light monitoring means 12 includes a light sensor 16 having a resistance which varies relatively to the magnitude of the ambient light intensity which is sensed by the sensor. The variable resistance light sensor 16 has a surge protector 18 connected thereto for protecting the sensor against possibly damaging electrical surges caused by such things as lightning. As light impinges upon the sensor 16, its variable internal resistance changes so that a respective voltage may be obtained for each light intensity level detected.

To provide a specific characteristic relationship between the impinging light intensity and the respective voltage derived from the sensor 16, the monitor means 2 includes means for establishing a proportional relationship between the sensed ambient condition and the proportional electrical signal derived therefrom. FIG. 1 shows that for the light monitoring means 12, this establishing means is a resistor network including resistors 22 and 24 and variable resistor 26. These resistors establish the maximum and minimum voltages and the proportional relationship between the light intensity impinging upon the sensor 16 and the output voltage provided thereby. In the preferred embodiment this resistor network acts as a linearizing network. To permit this linearizing network (and thus the present invention) to function both indoors and outdoors, the variable resistor 26 is included so that both high outdoor levels of light and low indoor levels of light can be accommodated.

The output from the sensor 16 and the network 20 is coupled through a resistor to the non-inverting input of an operational amplifier 28. The operational amplifier 28 is connected as is known in the art to provide a voltage amplifier means having, in the preferred embodiment, a gain of approximately 1.5. The electrical output of the amplifier is an analog voltage having an amplitude inversely proportional to the brightness of the ambient light sensed by the sensor 16. This output is connected to the first timer means 4 through a modulation control means and also to the disabling means 8. FIG. 1 indicates that the modulation means includes a variable resistor 30.

The humidity monitoring means 14 has similar components to those contained within the light monitoring means 12. In particular these elements include a variable resistance humidity sensor 32 having a surge protector 34 connected thereto and also having connected thereto a resistor network 36 which establishes the characteristic proportional relationship between the sensed humidity level and a second voltage derived from the sensed level. The output from the sensor 32 and the network 36 is coupled through a resistor to the non-inverting input of an operational amplifier 38 which is connected as is known in the art to provide a voltage amplifier means. As with the preferred embodiment operational amplifier 28, the preferred embodiment operational amplifier 38 has a gain of approximately 1.5. However, the output of the operational amplifier 38 is an analog voltage having an amplitude which is directly proportional to the sensed humidity. This analog voltage is provided both to the disabling means 8 and the first timer means 4. The output is provided to the first timer means 4 through a modulation means having a variable resistor 40. As shown in FIG. 1, the variable resistor 40 and the variable resistor 30 have a common connection which provides connection to the first timer means 4.

This common connection of the resistors 30 and 40 of the modulation means within the monitor means permits the settings of the two resistors to determine the relative effect of the modulation provided by the output voltages of the operational amplifiers 28 and 38. Equal settings of the resistors 30 and 40 cause an equal effect, whereas unequal settings cause one voltage to have more effect than the other. For example, if the resistor 30 is set to a resistance which is less than that of the resistor 40, the light intensity will have more of an effect on the subsequently described operation of the present invention than will the humidity. Conversely, if the resistance of the resistor 40 is less than that of the resistor 30, the humidity will have more of an effect on changing the operation of the present invention. Additionally, if the resistances of both the resistors 30 and 40 are set to zero, the modulation voltages will have their greatest effect, whereas if both of the resistances are set to their maximum values, the modulation voltages will have the least effect on the operation of the present invention.

With reference to FIG. 2, a preferred embodiment of the first timer means 4 will be described. The first timer means generally functions to generate a triggering signal when a time-varying reference level, as established within the first timer means, exceeds the magnitude of the proportional electrical signal provided by the joined monitoring means of the monitor means 2. More particularly, the first timer means 4 controls the duration of the "off" period of the present invention during which the watering system is deactivated.

The electrical signal from the monitor means 2 is received in the first timer means 4 by an integrating means 42. The integrating means smooths the signal from the monitoring means 2 so that short duration changes in the sensed ambient conditions will not trigger unnecesary activations of the watering system. The output from the integrating means 42 is coupled to the non-inverting input of an operational amplifier 44. The operational amplifier 44 provides a means for comparing the time-varying reference level with the magnitude of the proportional electrical signal received through the integrating means 42 from the monitor means 2 to determine when the reference level exceeds the magnitude of the monitor means electrical signal.

The non-inverting input of the operational amplifier 44 is coupled to the disabling means 8 so that the operational amplifier 44 also compares the reference level to the signal provided by the disabling means 8.

To insure that a small positive potential is always present at the non-inverting input of the operational amplifier 44, a voltage clamp means 46, such as a diode, is connected between the output and the non-inverting input of the operational amplifier 44.

The time-varying reference level used by the operational amplifier 44 is provided by a means for providing such a time-varying reference level. This means includes a variable resistor-capacitor network 48. This network includes a variable resistor 50, a resistor 52, a capacitor 54, a capacitor 56, a switch means 58, and a diode 60. The time constant of the reference level means 48 is varied by adjusting the resistor 50 or by opening or closing the switch means 58, thereby changing the resistance and/or capacitance of the reference level means 48. This variable resistor-capacitor network 48 is connected between the output of the operational amplifier 44 and the inverting input thereof as shown in FIG. 2.

In addition to being able to variably set the time constant of the time-varying reference level, the present invention includes means whereby the maximum value of the time-varying reference level may also be adjustably set. This is accomplished through the variable resistor 62, shown in FIG. 2 connected between the output of the operational amplifier 44 and the variable resistor-capacitor network 48.

In addition to being automatically controlled, as will be subsequently described, the present invention may be manually controlled to actuate the watering system. This manual control occurs by means of the switch means 64 connected to the non-inverting input of the operational amplifier 44.

The first timer means 4 further may include a "lockout" indicator means 66 and an "off" condition indicator means 68. The lock-out indicator means 66 includes an operational amplifier 70 which compares the voltage level at the output of the integrating means 42 with the voltage level at the wiper arm of the resistor 62. When the comparison is such that a modulation lock-out condition, as subsequently discussed, is present, a light emitting diode 72 will be illuminated to indicate such a condition. The light emitting diode of the "off" indicator 68 will be illuminated when the output of the operational amplifier 44 is high, thereby indicating that the watering system is shut off.

With reference to FIG. 3, the preferred embodiment of the second timer means 6 will be described. The second timer means 6 is responsive to the triggering signal provided by the first timer means 4 for actuating the watering system for a predetermined period of time. That is, the second timer means controls the duration of the "on" period of the watering system.

The second timer means 6 includes means for establishing a watering system actuation signal having a predetermined duration. FIG. 3 shows that this establishing means includes an operational amplifier 74 having its inverting input coupled to the output of the operational amplifier 44 of the first timer means 2. The actuation signal establishing means also includes means for changeably setting the predetermined period of time that the second timer means 6 actuates the watering system in response to the triggering signal from the first timer means 4. FIG. 3 shows that the changeably setting means includes a variable resistor-capacitor network 76. The predetermined period, or duration, may be changed by adjusting a variable resistor 78 contained within the network 76. The predetermined period may also be changed by manipulating a switch 80 so that a capacitor 82 is either connected to or disconnected from the network 76. By so changing the resistor 78 or the switch 80, the time constant of the network 76 is changed to thereby change the predetermined duration of the actuation signal established by the operational amplifier 74. FIG. 3 also shows that the variable resistor-capacitor network 76 is connected between the output of the operational amplifier 74 and the inverting input thereof.

The actuation signal establishing means further includes a means 84, connected to the inverting input of the operational amplifier 74, for supplying a voltage reference level. FIG. 3 shows that the reference level means 84 is a voltage divider circuit coupled to the operational amplifier 74 through a diode 86. This maintains the inverting input of the operational amplifier 74 at a voltage which is more positive than that on the non-inverting input of the operational amplifier 74 during the "off" period of the watering system. This helps prevent premature actuation of the watering system.

The establishing means further includes a resistor network 88 connected between the output of the operational amplifier 74 and the non-inverting input thereof. Included within the resistor network 88 is a switch means 90 for connecting either a resistor 92 or a resistor 94 within the resistor network 88 to the non-inverting input of the operational amplifier 74.

In addition to including the means for establishing a watering system actuation signal having a predetermined period of time, the second timer means 6 includes a switch means 96 connected to a valve 98 disposed within the watering system controlled by the present invention. The second timer means 6 further includes means for controlling the operation of the switch means 96 in response to the watering system actuation signal. That is, the switch controlling means is responsive to both the changeable setting means of the second timer means 6 and the triggering signal from the first timer means 4. FIG. 3 indicates that the controlling means includes a transistor drive circuit 100 and a relay coil 102.

The second timer means 6 shown in FIG. 3 may be duplicated and connected in series throughout the present invention so that a multitude of stages may be provided. Each successive timer stage is to be connected to the output of the operational amplifier 74 of each preceeding stage as indicated by the notation in FIG. 3. Thus, the present invention may include a third, or more, timer means.

With reference to FIG. 4, a preferred embodiment of the disabling means 8 will be described. The disabling means 8 compares the proportional electrical signal from the monitoring means 2 with a predetermined cut-off level and prevents the first timer means from generating the triggering signal when the magnitude of the proportional electrical signal passes the cut-off level. In particular, the disabling means 8 includes means 104 for determining when the humidity is above a predetermined level, means 106 for determining when the light intensity is below a predetermined level, and means 108 for monitoring temperature and determining when the temperature is below a predetermined level.

FIG. 4 indicates that the humidity determining means 104 receives the proportional electrical signal from the humidity monitoring means 14. The humidity signal is processed within the determining means 104 through means for variably setting the cut-off level and means for detecting when the cut-off level has been passed by the magnitude of the proportional electrical signal and is then applied to the first timer means 4 through means for coupling the detecting means to the first timer means.

The means for variably setting the cut-off level includes a resistor network 110 which is connected to the inverting input of an operational amplifier 112 to provide the cut-off reference level. The setting means also includes an adjustable resistor 114 through which the humidity electrical signal is applied to the non-inverting input of the operational amplifier 112. The resistor network 110 sets the absolute reference cut-off level, whereas the adjustable resistor 114 permits the level of the humidity which exceeds the cut-off level to be varied. That is, the adjustable resistor 114 permits the cut-off reference level set by the network 110 to be exceeded by any one of a plurality of settings within a range from a minimum humidity level to a maximum humidity level.

To determine when the humidity level does exceed the cut-off reference level, the determining means 104 includes the operational amplifier 112 for comparing the proportional humidity electrical signal to the predetermined cut-off reference level. The determining means 104 further includes a disable indicator means 116, such as the light emitting diode shown in FIG. 4. The light emitting diode is illuminated when the detected humidity level exceeds the predetermined cut-off reference level as established by the resistor network 110 and the setting of the variable resistor 114.

The light determining means 106 includes elements similar to those in the humidity determining means 104. However, in the light determining means, the light emitting diode therein is illuminated when the detected light intensity is below the predetermined cut-off reference level.

The temperature monitoring and determining means 108 includes similar elements to those contained in the humidity and light determining means 104 and 106. However, the temperature monitoring and determining means 108 further includes a variable resistance temperature sensor 118 which is protected against electrical surges by a surge protector 120. The temperature monitoring and determining means 108 also includes a resistor network 122 for establishing a characteristic proportionality between the sensed temperature and the electrical signal generated by the sensor 118 and the resistor network 122. This proportional signal is applied to the operational amplifier of the means 108 for comparison with a predetermined cut-off reference level established by a resistor network similarly to those as previously discussed with respect to the means 104 and 106. When the temperature is below the predetermined cut-off reference level, the light emitting diode in the means 108 is illuminated to thereby indicate that the reference level has been passed by the sensed condition.

As shown in FIG. 4 each of the outputs from the respective operational amplifiers of the means 104, 106 and 108 are coupled through respective diodes to a common node for connection to the non-inverting input of the operational amplifier 44 of the first timer means 4. This connection permits any one of the means 104-108 to disable, or "lock-out", the first timer means 4 whenever the predetermined cut-off reference level of the respective means is passed by that respective sensed ambient condition.

Figure 5:
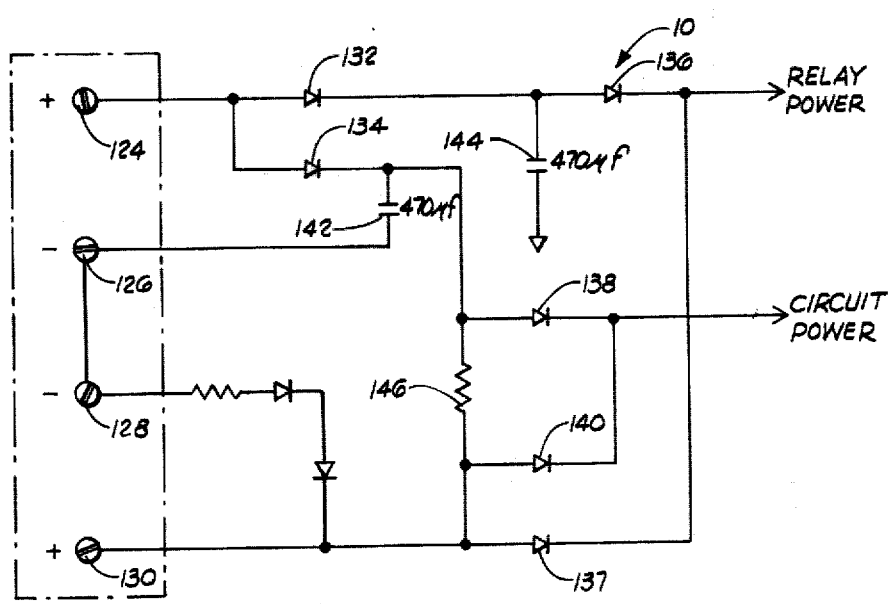
FIG. 5 is a schematic diagram of a preferred embodiment circuit of the power supply circuit of the present invention.

Referring to FIG. 5, there is shown therein the preferred embodiment of the power supply circuit for use with the present invention. FIG. 5 discloses that the power supply circuit includes a first pair of input connectors 124 and 126 and a second pair of input connectors 128 and 130. Connected to these input connectors is an array of diodes 132, 134, 136, 137, 138 and 140, capacitors 142 and 144, and resistors 146. This combination of components is designed to be powered by a photo-voltaic solar energy generator, a wind-powered electric generator, a low voltage from an alternating current source, a 12-volt battery (such as is used for automotive, marine or other uses), or any other suitable power source. If the 12-volt battery is used along with an additional charging source, such as a standard battery charger with tapered charging feature, should be employed. If the circuit is to be wind-powered, or solar powered, a 12-volt battery should also be used to provide power during those periods when there is no wind nor sunshine.

More particularly, a 12-volt battery can be connected to connectors 128 and 130 to provide power to the remainder of the circuit. Additionally, a solar operated photo-voltaic power source would be connected to the same terminals to charge the battery during sunny weather while relying on the battery to power the circuit when sunshine is not present.

On the other hand, the photo-voltaic power source could be connected to connectors 124 and 126 to both power the present invention and charge the battery connected to connectors 128 and 130. Charging would occur through the resistor 146 whenever the voltage connected to the terminals 124 and 126 is greater than the battery voltage. If the voltage at the terminals 124 and 126 is less than the battery voltage, the diode 134 prevents the battery from discharging through the connector 124-126 power supply. An ordinary automobile battery charger having a tapered output or a wind-powered generator could also be used to charge the battery. Likewise, a rectified alternating current source could charge the battery.

In addition to having a solar powered photo-voltaic power source connected to the terminals 124 and 126, an alternating current source could be used to obtain the requisite rectified voltage source. When an alternating current source is used, the diodes 132 and 134 rectify it and capacitors 142 and 144 filter the rectified voltage.

When multiple power sources are used (i.e., when power supplies are connected to both pairs of connectors 124 and 126 and 128 and 130) the diodes 136 and 137 permit whichever power supply has a higher voltage to provide energization to the relay shown in FIG. 3. That is, if the voltage of the power source connected to the connectors 124 and 126 is greater than the voltage of the battery connected to the connectors 128 and 130, the former power source energizes the circuit through diode 136. However, if this voltage is lower than that of the battery, then power is provided by the battery through the diode 137. Diodes 138 and 140 function similarly to control the powering of the remainder of the circuit.

Referring to FIGS. 1-5 in general, the operation of the present invention will be described. The light monitoring means 12 and the humidity monitoring means 14 shown in FIG. 1 each monitor their respectively named ambient conditions. The proportional electric signals which are derived from the monitoring process are combined through the variable modulating means provided by the resistors 30 and 40. As previously mentioned, the resistance settings of the resistors 30 and 40 determine the relative effect of the individual modulation voltages which are derived from the monitoring means 12 and 14.

The joined outputs from the monitoring means are connected to the integration means 42 of the first timer means 4 shown in FIG. 2. This integrating means smooths abrupt changes in the modulation voltage which can be caused by variable cloudiness and by rapid humidity variations, for example. The integration means 42 causes the modulation voltages from the monitoring means to appear as an average. This prevents the watering system from being activated too frequently during varying weather conditions.

The output from the integration means is supplied to the non-inverting input of the operational amplifier 44. This voltage which is applied to the non-inverting input is the reference to which the capacitor 54 (and the capacitor 56 if the switch 58 is closed) must charge to switch the output of the operational amplifier 44 to a low voltage level whereby the operational amplifier provides a triggering signal to the second timer means 6.

Thus, the monitoring means 2 in combination with the integration means 42 permits the monitored light and humidity to modulate the non-inverting input of the operational amplifier 44 of the first timer means 4. This occurs by establishing a short-term average voltage to which the capacitor 54 (and the capacitor 56 when the switch 58 is closed) must charge to cause the operational amplifier 44 to switch to a low output state. The lower that the non-inverting input voltage (i.e., the modulation voltage) is, the less time it will take to charge the capacitor 54 (and the capacitor 56 if the switch 58 is closed) to the switch-over voltage. Conversely, the higher the non-inverting input is, the more time it takes to charge to the switch-over voltage.

The operation of the first timer means 4 is such that when the switch-over voltage is obtained, a triggering signal is generated. By appropriately setting the various controllable components within the first timer means 4, the time between consecutive switch-overs can be controlled. That is, the first timer means can be set to determine the length of the "off" period between consecutive watering system actuations. By means of the various variable controls within the first timer means, the off time can be varied in accordance with the needs of the horticultural plants so that the heat or water stresses thereof can be relieved. At one extreme, the first timer means can be adjusted to cause the second timer means to periodically actuate the watering system throughout the entire twenty-four hours of a day for applications such as rooting cuttings. When operated this way, the first timer means triggers the second timer means during daylight hours in accordance with both the monitored light's brightness (via the light monitoring means 12) and the air's dryness (via the humidity monitoring means 14). For example, the first timer means 4 will trigger the second timer means 6 more often during conditions of high light intensity and dry air and less often during cloudy skies and damp air. At night, the second timer means will be operated more often when the air is dry and will operate less often when the air is moist. At the other extreme, the operation of the first timer means can be controlled to cause the second timer means to operate only once per day, and then only on those days which have both intense light and dry air. This mode is useful for periodic field irrigation, pot watering in greenhouses, reducing fire risks from dried out or brushy areas, and the like. The various adjustable components previously mentioned to be in the structure of the present invention permit these various operating modes (or any of a plurality of intermediate modes between these two extremes) to be obtained.

In obtaining these modes, the operational amplifier 44 acts as the comparator of an astable (free-running) multivibrator having as astable condition which can be stopped by a modulation voltage applied to the non-inverting input of the operational amplifier. As previously discussed, this modulation voltage is provided by the monitor means 2. This modulating voltage must be low enough to cause the multivibrator to assume the astable mode of operation. For example, assume that the modulating voltage at the non-inverting input of the operational amplifier 44 is eight volts, that the movable arm of the resistor 62 is at the top of the resistor so that the full output of the operational amplifier 44 (for example, sixteen volts) is used to charge the capacitor 54, that the switch 58 is open as shown in FIG. 2, and that the timing begins just after the operational amplifier 44 output goes high. When the output goes high, the capacitor 54 will charge through the resistors 50 and 52. The capacitor 54 voltage is coupled through an isolation operational amplifier to the inverting input of the operational amplifier 44. The capacitor 54 will continue to charge until its voltage exceeds the eight volts at the non-inverting input of the comparator-acting operational amplifier 44. When the inverting input voltage so exceeds the non-inverting input voltage, the output of the operational amplifier 44 drops to a low level. This transition from a high output to a low output is coupled through the capacitor shown in FIG. 2 to the inverting input of the operational amplifier 74 of the second timer means 6 as shown in FIG. 3. This low-going transition causes the second timer means 6 to actuate the watering system as will be subsequently described with respect to the second timer means 6. However, in addition to actuating the watering system, the output of the second timer means 6 affects the first timer means 4 by being coupled to the capacitor 54 through the diode shown in FIG. 2. This coupling maintains the capacitor 54 voltage high as long as the output of the second timer means 6 is high. This in turn keeps the inverting input of the operational amplifier 44 high so that it will be prevented from recovering until the second timer means 6 output goes low. Thus, the next off timing period does not begin until the completion of the most recent application of water as actuated by the second timer means 6.

Once the second timer means 6 output does go low (thus indicating the end of the most recent watering application), the diode coupling the output of the second timer means 6 to the capacitor 54 becomes reverse biased and the first timer means is allowed to recover. Because at this moment the operational amplifier 44 output is still low, the capacitor 54 discharges towards zero volts through the resistor 52 and the diode 60. However, the voltage of the capacitor 54 never drops completely to zero because the non-inverting input of the operational amplifier 44 is clamped to a positive voltage by the diode 46 being connected between the non-inverting input and the output of the operational amplifier 44.

As will be noted upon an examination of FIG. 2, the time required for the capacitor 54 to charge to the voltage level at the non-inverting input of the operational amplifier 44 is determined by its capacitance and the values set into the resistor 50 as well as the resistor 52 (however, for the values shown in FIG. 2 the effect of the resistor 52 resistance is generally negligible). In addition to being able to vary the time constant by means of the resistor 50, the time constant may be changed by closing the switch means 58 so that the capacitor 56 is connected in parallel with the capacitor 54. When the switch 58 is closed, this increases the length of the time constant.

Having first assumed that the wiper arm is at the top of the resistor 62 so that the full output of the operational amplifier 44 is used to charge the capacitor 54, it will next be assumed that the setting of the resistor 62 is such that only a portion of the maximum output is used to charge the capacitor. Thus, by changing the resistance of the resistor 62 the maximum magnitude of the time-varying reference signal provided to the inverting input of the operational amplifier 44 is varied. For example, assume that a maximum of only ten volts, instead of an absolute maximum of sixteen volts, is used to charge the capacitors. This will cause the off time to lengthen because the capacitor 54 will not charge to the level of the voltage at the non-inverting input as quickly as when the absolute maximum charging voltage is used. However, despite the lengthened off time the first timer means 4 will continue to be in its astable state as long as the non-inverting input voltage is not greater than ten volts. However, now assume that further adjustment of the resistor 62 is made so that a maximum of six volts is present at its movable arm. Again the capacitor 54 will charge at a slower pace, but more important is the fact that the capacitor voltage cannot rise high enough to exceed a voltage on the non-inverting input which is in excess of six volts. If the voltage on the non-inverting input is greater than six volts, the first timer means 4 is placed in the condition called "lock-out". While the lock-out condition persists, no triggering signals are generated for triggering the second timer means 6, and thus no watering will occur.

As long as a lesser voltage is maintained on the inverting input than is on the non-inverting input of the operational amplifier 44, the lock-out condition will continue. However, by changing the non-inverting input voltage of the operational amplifier 44 downward (e.g., by varying the resistance values of the resistors 30 and 40), the non-inverting input voltage will eventually become negative with respect to the six volts at the inverting input. This is the precise condition needed for the operational amplifier 44 to switch to its low output state thereby generating the negative transient which is to be coupled to the second timer means 6 for actuating the watering system. Therefore, it is apparent that the resistor 62 is a means for adjustably setting the maximum value of the time-varying reference level provided by the resistor-capacitor network 48. Also it is apparent that this affects the duration of the off periods by providing a lock-out condition.

In addition to the effect of the resistor 62, the resistor 50 affects the time required to charge the capacitor 59 to whatever maximum level the resistor 62 may permit. This, too, affects the duration of the off periods. Thus, by changing the resistance of the resistor 50 and/or of the resistor 62 and/or the settings of the resistors 30 and/or 40 of the monitoring means whereby the modulation voltage applied to the non-inverting input of the operational amplifier 44 is changed, the duration of the off periods is controlled.

With reference to FIG. 3, the operation of the second timer means 6 in response to the triggering signal from the first timer means 4 will be described. In general, the second timer means 6 actuates the watering system which may include such devices as overhead sprinklers, surface soaker hoses, surface or underground irrigation devices, flower pot watering apparatus, mist applicators for horticultural propagation, and the like. The second timer means 6 functions as a one-shot or monostable multivibrator constructed of the operational amplifier 74 and the external timing resistors, capacitors, diodes and other components shown in FIG. 3. The operational amplifier 74 functions as a charging and discharging voltage source for the timing capacitors of the resistor-capacitor network 76. The operational amplifier also acts as the driving source for the transistor network 100 and as a comparator to detect the end of the programmed water application period.

The steady-state condition of the operational amplifier 74 occurs when the voltage on the inverting input thereof, as set by the voltage divider established by the resistor network 84 when the operational amplifier 74 output is low, is more positive than the small positive voltage existing on the non-inverting input. This steady-state condition of the inputs of the operational amplifier 74 keeps the output in its low state. By having the difference between the voltages on the inverting and non-inverting inputs sufficiently large, most voltage transients will not falsely trigger the second timer means 6. The voltage from the voltage divider, which acts as a reference level clamping circuit, is coupled to the inverting input of the operational amplifier by the diode 86. The diode 86 also disconnects the reference level clamping circuit when the timing capacitor 83 (and the capacitor 82 if the switch 80 is closed) is being charged.

When the first timer means 4 sends the negative triggering signal to the inverting input of the operational amplifier 74, as previously described, this causes the inverting input of the operational amplifier 74 to momentarily be less positive than the non-inverting input so that the operational amplifier 74 output immediately goes to its high state. Assuming the switches 80 and 90 are as shown in FIG. 3 when the output goes high, the capacitor 83 begins charging through the resistors of the resistor-capacitor network 76 toward the voltage at the junction of the resistors 150 and 152. With the operational amplifier 74 output high, the resistor 92 and the resistor 154 form a voltage divider which applies a voltage to the non-inverting input. This non-inverting input voltage is the reference voltage to which the timing capacitor 83 must charge to cause the operational amplifier 74 to act as a comparator and switch back to its low state. When the inverting input voltage does exceed the non-inverting input voltage, the operational amplifier 74 output immediately goes to its low state thereby shutting down the water dispensing devices within the watering system. As the operational amplifier 74 output goes low, the capacitor 83 discharges through the diode paralleling the resistor 78 and through the other appropriate resistors. This diode causes the high resistance of the resistor 78 to be effective during charging time and effectively shorts it during discharging time to provide rapid recovery at the end of the timing period. The resistors 92 and 154 cause a heavy positive feedback while the operational amplifier 74 switches states so that a rapid snap-action switching is provided.

The foregoing has described the second timer means 6 action in the "seconds" position of switches 80 and 90. Changing the switches to their other positions causes the second timer means 6 to be in the "minutes" mode. This adds the capacitor 82 into the active variable resistor-capacitor circuit and replaces the resistor 92 with the resistor 94. This causes the duration of the watering system actuation signal to be increased.

While the output of the operational amplifier 74 is in its high state, the watering system is actuated because the high output causes the transistor of the network 100 to switch on so that the relay coil 102 is energized to actuate the switch 96. The high state of the operational amplifier 74 also illuminates the light emitting diode of the network 100.

When the programmed timing period is complete (i.e., when the voltage on the inverting input is charged to a higher level than the voltage on the non-inverting input of the operational amplifier 74) the output of the operational amplifier 74 goes low and couples a negative triggering signal through the capacitor shown in FIG. 3 to a third timer means if one is contained within the watering system control means.

Having described the operation of the monitoring means 2, the first timer means 4 and the second timer means 6, examples of the operation will now be given. It is to be assumed that the circuit supply voltage is seventeen volts. Further, it is to be initially assumed that the resistor 30 and the resistor 40 are set to zero resistance so that the modulation from the monitoring means is at its maximum. Under these conditions the non-inverting input of the operational amplifier 44 will vary between about three volts when both bright light and dry air exist, such as on a cloudless day with dry air, and about sixteen volts on a dark, foggy night. If the resistor 62 is adjusted to provide a capacitor 54 charging voltage which is slightly more than sixteen volts, the operational amplifier 44 will assume its astable mode and periodic watering system actuation will persist during the entire twenty-four hours of the day. This is so because the capacitor 54 will always charge to a voltage high enough to meet the switch-over requirement set by the voltage on the non-inverting input of the operational amplifier 44. During the daytime, and at night when the humidity is low, the operational amplifier 44 non-inverting input voltage will decrease from sixteen volts so that watering occurs more often. The lower the humidity and the brighter the light, the lower will be the operational amplifier 44 non-inverting input voltage and the more frequent will be the watering. When night returns, the operational amplifier 44 non-inverting voltage will increase, thereby causing the watering to occur less frequently.

Assuming that the resistor 62 is set to provide a capacitor 54 charging voltage of only eight volts, the modulation voltage applied to the non-inverting input of the operational amplifier 44 will keep the amplifier in the lock-out mode until the modulation voltage decreases to less than eight volts. Thus, the control apparatus is prevented from operating for a portion of the day. However, by re-adjusting the resistor 62 slightly upward toward the sixteen-volt maximum which might be applied to the non-inverting input, the control apparatus will function more frequently than when the setting is at eight volts. Thus, watering occurs during a greater portion of the day when the resistor 62 is set more closely toward the maximum voltage which might be applied to the non-inverting input of the operational amplifier 44.

Certainly other supply voltages could be used in the present invention to obtain different timing results; however, the same relative actions of the controlling apparatus would be obtained.

As just described, one setting of the resistor 62 permits watering to occur throughout the entire day when the charging voltage is sufficiently high. At the other extreme, the control apparatus may be adjusted so that a very limited number of waterings may occur. Such operation might be used for greenhouse pot watering, outdoor irrigation application, or the like. Again it will be assumed that the circuit voltage supply is seventeen volts. However, the switch 58 will be switched to connect the capacitor 56 in parallel with the capacitor 54. This increase in capacitance greatly lengthens the time required to charge the operational amplifier 44 inverting input voltage to a level which causes the operational amplifier 44 to switch to its low output state. If the resistors 30 and 40 are set for maximum resistance so that the modulation voltage will be no lower than approximately ten volts when there is full light and very dry air existing simultaneously, lower levels of light intensity or higher levels of humidity will produce a modulation voltage greater than ten volts, reaching a sixteen-volt maximum during foggy nights. If the resistor 62 is then set to provide slightly more than ten volts at its wiper arm, the operational amplifier 44 will switch to its low output state only on those days which have very bright light and very low humidity. All other days not meeting these conditions will not switch the operational amplifier 44 output to its low state. Therefore, watering will be applied only on those days which have both very bright light and very dry air. Adjusting the resistor 62 to permit a higher charging voltage slightly above ten volts will cause the modulation voltage to meet the operational amplifier 44 switch-over condition on additional days which have less heat and moisture stress conditions. Further resistor 62 adjustment upward would cause two waterings on highly stressful days and only one watering on less stressful days.

Thus, in this way the present invention functions to control the watering system to which it is connected. However, there is a further component of the present invention which is used to disable any watering when certain cut-off reference levels have been passed by the monitored ambient conditions. This is accomplished with the disabling means 8. In particular, the humidity determining means 104 uses the signal from the operational amplifier 38 of the humidity monitoring means 14 to determine when this signal is above a predetermined cut-off reference level. This signal is applied to the resistor 114 of the humidity determining means so that the humidity level at which the cut-off reference level is passed may be selected. That is, the resistor 114 is adjusted to switch the operational amplifier 112 to its high output voltage state when the humidity increases to more than the predetermined reference level as established by the resistor network 110 connected to the inverting input of the operational amplifier 112. When the humidity does increase beyond the cut-off level, the operational amplifier 112 output voltage goes to its high level. This high level of voltage is coupled through a diode and resistor to the non-inverting input of the operational amplifier 44. This drives the operational amplifier 44 to its lock-out mode regardless of the modulation voltage provided by the output of the integrating means 42. When the humidity is lower than that required to switch the operating amplifier 112, the operational amplifier 112 remains in its low output voltage state. This reverse biases the diode so that the operational amplifier 112 is disconnected from the modulation circuit.

As will be apparent upon examination of FIG. 4, the light determining means 106 functions similarly to the humidity determining means. However, the operational amplifier of the light determining means switches to its high output state when the light intensity level drops below a predetermined cut-off reference level established by the resistor network connected to the inverting input of the operational amplifier. The specific light intensity level which surpasses this cut-off reference level is adjustably selected by means of the variable resistor contained within the light determining means 106.

Similarly, the temperature monitoring and determining means 108 detects the temperature and provides a lock-out signal to the operational amplifier 44 whenever the temperature is below a predetermined cut-off reference level as established by the resistor network connected to the inverting input of the operational amplifier of the temperature monitoring and determining means 108. Again, the specific temperature level which passes the cut-off reference level is determined by the variable resistor contained within the monitoring and determining means.

To indicate when any of the cut-off reference levels has been passed, the present invention includes respective light emitting diodes associated with each ambient condition determining means within the disabling means 8. Thus, when either the temperature is below the respective cut-off reference level, the light intensity level is below the respective cut-off reference level, or the humidity is above the respective cut-off reference level, the respectively associated light emitting diode will be illuminated. Also indicating a lock-out condition is the lock-out indicator means 66. The light emitting diode contained therein gives a visual indication when the modulation voltage provided by the monitoring means 2 has increased to a value high enough to lock-out the operational amplifier 44.

Referring once again to FIG. 2, the manual switch 64 will be described. This switch, which is connected to the operational amplifier 44 non-inverting input, is a normally open, press-type switch. When the operational amplifier 44 is in its high output voltage state, momentarily depressing the switch 64 switches the operational amplifier 44 to its low output voltage state thereby triggering the second timer means 6 to actuate an extra cycle of watering. This also resets the timing capacitors within the first timer means 4 so that a new off time period will be started. Utilizing the switch 64 permits an operator to manually relieve temperature and humidity stress if the initial adjustments of the other controls have not been optimized.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims. In particular, the specific component values indicated in the figures and the other specific parameters mentioned above are not to be in any way considered as limiting the values which may be used.

What is claimed is:

1. An apparatus for automatically controlling a watering system in response to a comparison of an ambient condition with a time-varying reference level having an adjustable maximum value, said apparatus comprising:
   monitor means for sensing the magnitude of the ambient condition and converting the sensed magnitude into a proportional electrical signal;
   first timer means for generating a triggering signal when the time-varying reference level exceeds the magnitude of the proportional electrical signal;
   second timer means, responsive to the triggering signal, for actuating the watering system for a predetermined period of time; and
   disabling means for comparing the proportional electrical signal with a predetermined cut-off level, and for preventing said first timer means from generating the triggering signal when the magnitude of the proportional electrical signal passes the cut-off level.

2. An apparatus as recited in claim 1, wherein said monitor means includes:
   a sensor having a resistance which varies relative to the magnitude of the ambient condition sensed by said sensor; and
   means for establishing the proportional relationship between the sensed ambient condition and the proportional electrical signal.

3. An apparatus as recited in claim 2, wherein said establishing means includes:
   a resistor network connected to said sensor.

4. An apparatus as recited in claim 1, wherein said first timer means includes:
   means for adjustably setting the maximum value of the time-varying reference level; and
   means for comparing the time-varying reference level with the magnitude of the proportional electrical signal to determine when the reference level exceeds the magnitude of the electrical signal.

5. An apparatus as recited in claim 1, wherein said second timer means includes:
   means for changeably setting the predetermined period of time said second timer means actuates the watering system in response to the triggering signal;
   switch means connected to a valve in the watering system; and
   means, responsive to said changeably setting means and the triggering signal, for controlling the operation of said switch means.

6. An apparatus as recited in claim 1, wherein said disabling means includes:
   means for variably setting the cut-off level;
   means for detecting when the cut-off level has been passed by the magnitude of the proportional electrical signal; and
   means for coupling said detecting means to said first timer means.

7. An apparatus as recited in claim 1, wherein said first timer means includes:
   a first operational amplifier having its non-inverting input coupled to said monitor means and having its output coupled to said second timer means;
   a first variable resistor-capacitor network connected between the output and the inverting input of said first operational amplifier; and
   a voltage clamp means connected between the non-inverting input and the output of said operational amplifier.

8. An apparatus as recited in claim 7, wherein said second timer means includes:
   a second operational amplifier having its inverting input coupled to the output of said first operational amplifier;
   a second variable resistor-capacitor network connected between the output and the inverting input of said second operational amplifier;

a voltage reference level means connected to the inverting input of said second operational amplifier;

a first resistor network connected between the output and the non-inverting input of said second operational amplifier; and means, connected to the output of said second operational amplifier, for controlling the operation of a valve in the watering system.

9. An apparatus as recited in claim 8, wherein said monitor means includes:

a third operational amplifier having its output both coupled to the non-inverting input of said first operational amplifier and connected through a resistor to the inverting input of said third operational amplifier;

an ambient condition sensor; and a second resistor network connecting said sensor to the non-inverting input of said third operational amplifier for establishing the proportional relationship between the sensed ambient condition and the proportional electrical signal established by said monitor means.

10. An apparatus as recited in claim 9, wherein said disabling means includes:

a fourth operational amplifier having its output coupled to the non-inverting input of said first operational amplifier and having its non-inverting input connected to the output of said third operational amplifier through an adjustable resistor; and a third resistor network connected to the inverting input of said fourth operational amplifier for providing the cut-off reference level.

11. An apparatus for controlling a first watering system, comprising:

means for monitoring light and for converting the intensity of the light into a first voltage proportional to the light;

means for monitoring humidity and for converting the level of the humidity into a second voltage proportional to the humidity;

means for monitoring temperature and for determining when the temperature is below a first predetermined level;

means for determining when the light intensity is below a second predetermined level;

means for determining when the humidity is above a third predetermined level;

first timer means, responsive to the plurality of said monitoring means and said determining means, for generating a triggering signal when a time-varying voltage reference level having a presettable maximum value exceeds each of the first and second voltages and each of the output voltages provided by said temperature monitoring and determining means, said light intensity determining means, and said humidity determining means; and second timer means, responsive to the triggering signal, for actuating the first watering system for a predetermined period of time.

12. An apparatus as recited in claim 11, further comprising:

a third timer means for actuating a second watering system when said second timer means completes an actuation of the first watering system.

13. An apparatus as recited in claim 11, wherein said light monitoring means includes:

a variable resistance light sensor; and a resistor network connected to said light sensor to establish the proportional relationship between the sensed light intensity and the first voltage.

14. An apparatus as recited in claim 11, wherein said humidity monitoring means includes:

a variable resistance humidity sensor; and a resistor network connected to said humidity sensor to establish the proportional relationship between the sensed humidity level and the second voltage.

15. An apparatus as recited in claim 11, wherein said temperature monitoring means includes:

a variable resistance temperature sensor; and a resistor network associated with said temperature sensor for adjustably establishing a temperature cut-off level.

16. An apparatus as recited in claim 11, wherein each of said light intensity and humidity determining means includes:

a respective adjustable resistance means for establishing a respective cut-off level.

17. An apparatus as recited in claim 11, wherein said second timer means includes:

an operational amplifier having its inverting input coupled to the output of said first timer means;

a variable resistor-capacitor network connected between the output and the inverting input of said operational amplifier;

a voltage reference level means connected to the inverting input of said operational amplifier;

a resistor network connected between the output and the non-inverting input of said operational amplifier; and means, connected to the output of said operational amplifier, for controlling the operation of a valve in the first watering system.

18. An apparatus as claimed in claim 11, wherein said first timer means includes:

a first operational amplifier having its non-inverting input coupled to the plurality of said light, humidity, and temperature monitoring and determining means and having its output coupled to said second timer means;

a first variable resistor-capacitor network connected between the output and the inverting input of said first operational amplifier; and a voltage clamp means connected between the non-inverting input and the output of said first operational amplifier.

19. An apparatus as recited in claim 18, wherein said second timer means includes:

a second operational amplifier having its inverting input coupled to the output of said first operational amplifier;

a second variable resistor-capacitor network connected between the output and the inverting input of said second operational amplifier;

a voltage reference level means connected to the inverting input of said second operational amplifier;

a first resistor network connected between the output and the non-inverting input of said second operational amplifier; and means, connected to the output of said second operational amplifier, for controlling the operation of a valve in the first watering system.

20. An apparatus as recited in claim 19, wherein said light monitoring means includes:

a variable resistance light sensor; and a second resistor network connected to said light sensor to establish the proportional relationship between the sensed light intensity and the first voltage.

21. An apparatus as recited in claim 20, wherein said humidity monitoring means includes:
   a variable resistance humidity sensor; and
   a third resistor network connected to said humidity sensor to establish the proportional relationship between the sensed humidity level and the second voltage.

22. An apparatus as recited in claim 21, wherein said temperature monitoring means includes:
   a variable resistance temperature sensor; and
   a fourth resistor network associated with said temperature sensor for adjustably establishing a temperature cut-off value.

23. An apparatus as recited in claim 22, wherein each of said light intensity and humidity determining means includes:
   a respective adjustable resistance means for establishing a respective reference level.

24. A method of controlling a watering system, comprising the steps of:
   monitoring the ambient light intensity and generating a first electrical signal proportional thereto;
   monitoring the ambient humidity level and generating a second electrical signal proportional thereto;
   monitoring the ambient temperature and generating a third electrical signal when the temperature is below a predetermined cut-off value;
   comparing a time-varying reference voltage with the monitored light, humidity and temperature electrical signals; and
   actuating the watering system for a predetermined period of time when the magnitude of the time-varying reference level exceeds each of the first, second and third electrical signals.

25. An apparatus for automatically controlling a watering system, comprising:
   first ambient condition monitor means for sensing the magnitude of a first ambient condition and for converting the sensed magnitude of the first ambient condition into a first electrical signal;
   second ambient condition monitor means for sensing the magnitude of a second ambient condition and for converting the second ambient condition into a second electrical signal, said first and second ambient condition monitor means including variable modulating means for variably combining said first electrical signal and said second electrical signal to provide a modulation signal;
   first timer means for generating a triggering signal, said first timer means including:
      time-varying reference level means for providing a reference level electrical signal having a magnitude variable over time;
      comparing means for determining when the magnitude of said reference level electrical signal exceeds a value of said modulation signal and for generating said triggering signal in response thereto; and
      coupling means for coupling said modulation signal to said comparing means;
   second timer means, responsive to said triggering signal, for actuating the watering system for a predetermined period of time; and
   disabling means for comparing magnitudes of said first electrical signal and said second electrical signal with respective predetermined cut-off levels and for preventing said first timer means from generating said triggering signal when the magnitude of either said first or second electrical signal passes its respective cut-off level.

26. An apparatus as defined in claim 25, wherein said time-varying reference level means includes means for adjustably setting a maximum value of the variable magnitude of said reference level electrical signal so that the maximum magnitude of said reference level electrical signal can be set below a minimum magnitude of said modulation signal to lock-out said comparing means from generating said triggering signal.

27. An apparatus as defined in claim 25, wherein said coupling means includes integrating means for integrating said modulation signal and for providing the integrated modulation signal to said comparing means.

28. An apparatus as defined in claim 27, wherein said time-varying reference level means includes means for adjustably setting a maximum value of the variable magnitude of said reference level electrical signal so that a maximum magnitude of said reference level electrical signal can be set below a minimum magnitude of said integrated modulation signal to lock-out said comparing means from generating said triggering signal.

29. An apparatus as defined in claim 28, wherein said time-varying reference level means is responsive to said second timer means so that said reference level electrical signal is maintained at the maximum magnitude for the predetermined period of time during which said second timer means actuates the watering system.

30. An apparatus as defined in claim 25, wherein said time-varying reference level means is responsive to said second timer means so that said reference level electrical signal is maintained at a maximum magnitude for the predetermined period of time during which said second timer means actuates the watering system.

31. An apparatus as defined in claim 25, wherein said modulating means and said time-varying reference level means are controllable to set said apparatus for operating only on days having bright sunshine and relatively low humidity.

32. An apparatus for automatically controlling a watering system, comprising:
   light sensing means;
   first operation amplifier means having first input means and first output means;
   first connector means for connecting said light sensing means to said first input means of said first operational amplifier means;
   humidity sensing means;
   second operational amplifier means having second input means and second output means;
   second connector means for connecting said humidity sensing means to said second input means of said second operational amplifier means;
   first variable resistance means connected to said first output means of said first operational amplifier means;
   second variable resistance means connected to said second output means of said second operational amplifier means, said second variable resistance means also connected to said first variable resistance means so that a common connection therebetween is formed;

third operational amplifier means having third input means and third output means;

third connector means for connecting said common connection of said first and second variable resistance means to said third input means of said third operational amplifier means;

time-varying reference level means, connected between said third input means and said third output means of said third operational amplifier means, for providing a reference level electrical signal having a magnitude variable over time;

fourth operational amplifier means having fourth input means connected to said third output means of said third operational amplifier means and further having fourth output means connected to said time-varying reference level means;

first variable resistor-capacitor network means connected between said fourth input means and said fourth output means of said fourth operational amplifier means;

resistor network means connected between said fourth input means and said fourth output means of said operational amplifier means; and watering system switch means associated with said fourth output of said fourth operational amplifier means.

33. An apparatus as defined in claim 32, wherein said first connector means includes third variable resistance means for adapting said apparatus to accommodate high levels of light and low levels of light so that said apparatus can be utilized both outdoors and indoors.

34. An apparatus as defined in claim 32, wherein said third connector means includes integrating means comprising:
fifth operational amplifier means having fifth input means and fifth output means, said fifth output means connected to said third input means of said third operational amplifier means;
resistance means connected between said common connection of said first and second variable resistance means and said fifth input means of said fifth operational amplifier means; and
first capacitance means connected to said resistance means and said fifth input means of said fifth operational amplifier means.

35. An apparatus as defined in claim 32, wherein said time-varying reference level means includes:
second variable resistor-capacitor network means;
third variable resistance means connected between said third output of said third operational amplifier means and said second variable resistor-capacitor network means; and
fourth connector means for connecting said second variable resistor-capacitor network means to said third input means of said third operational amplifier means.

36. An apparatus as defined in claim 35, further comprising lock-out indicator means for indicating when a voltage provided by said third variable resistance means is greater than a voltage provided by said third connector means.

37. An apparatus as defined in claim 35, wherein said second variable resistor-capacitor network includes:
first capacitance means;
second capacitance means; and
switch means for connecting said first and second capacitance means in parallel.

38. An apparatus as defined in claim 32, further comprising surge protector means for protecting said light sensor means and said humidity sensor means from electrical surges.

39. An apparatus as defined in claim 32, wherein:
said fourth input means of said fourth operational amplifier means includes a non-inverting input and an inverting input;
said resistor network means includes means for providing positive voltage to said non-inverting input of said fourth operational means; and
said apparatus further comprises voltage reference level means for maintaining a second positive voltage on said inverting input of said fourth operational amplifier means, and second positive voltage being more positive than said first positive voltage.

40. An apparatus as defined in claim 32, further comprising:
temperature monitoring and determining means for monitoring temperature and for determining when the temperature is below a first predetermined level and for providing a first watering system cut-off signal in response thereto;
light intensity determining means for determining when the light intensity is below a second predetermined level and for providing a second watering system cut-off signal in response thereto, said light intensity determining means having input means connected to said first output means of said first operational amplifier means;
humidity determining means for determining when the humidity is above a third predetermined level and for providing a third watering system cutoff signal in response thereto, said humidity determining means having an input means connected to said second output means of said second operational amplifier means; and
means for connecting said first, second and third watering system cut-off signals to said third input means of said third operational amplifier means.

41. An apparatus as defined in claim 40, further comprising disable indicator means for indicating when said first watering system cut-off signal or said second watering system cut-off signal or said third watering system cut-off signal is provided by a respective one of said temperature monitoring and determining means, said light intensity determining means, and/or said humidity determining means.

42. An apparatus as defined in claim 32, further comprising switch means, connected to said third input means of said third operational amplifier means, for providing manual operation of said apparatus.

43. An apparatus as defined in claim 32, wherein:
said first connector means is connected to said light sensing means so that said light sensing means has one terminal thereof connected to ground potential; and
said second connector means is connected to said humidity sensing means so that said humidity sensing means has one terminal thereof connected to ground potential.

* * * * *